United States Patent
Forester

(10) Patent No.: US 10,410,233 B2
(45) Date of Patent: Sep. 10, 2019

(54) METHOD, APPARATUS, AND COMPUTER PROGRAM PRODUCT FOR AUTO-REPLENISHING AN INVENTORY OF PROMOTIONS

(71) Applicant: Groupon, Inc., Chicago, IL (US)

(72) Inventor: Bryce Forester, Chicago, IL (US)

(73) Assignee: GROUPON, INC., Chicago, IL (US)

( * ) Notice: Subject to any disclaimer, the term of this patent is extended or adjusted under 35 U.S.C. 154(b) by 242 days.

(21) Appl. No.: 15/439,993

(22) Filed: Feb. 23, 2017

(65) Prior Publication Data

US 2017/0236141 A1    Aug. 17, 2017

Related U.S. Application Data

(63) Continuation of application No. 14/494,053, filed on Sep. 23, 2014, now Pat. No. 9,619,817.

(60) Provisional application No. 61/883,316, filed on Sep. 27, 2013.

(51) Int. Cl.
G06Q 30/00 (2012.01)
G06Q 30/02 (2012.01)

(52) U.S. Cl.
CPC ..... *G06Q 30/0223* (2013.01); *G06Q 30/0211* (2013.01)

(58) Field of Classification Search
None
See application file for complete search history.

(56) References Cited

U.S. PATENT DOCUMENTS

| | | | |
|---|---|---|---|
| 5,245,533 A * | 9/1993 | Marshall | G06Q 30/02 705/14.13 |
| RE45,006 E * | 7/2014 | Deaton | G06Q 20/20 705/14.38 |
| 2004/0054575 A1* | 3/2004 | Marshall | G06Q 30/0236 705/14.36 |
| 2006/0085246 A1* | 4/2006 | Li | G06Q 30/0202 705/7.31 |
| 2007/0016508 A1* | 1/2007 | Lapointe | G06Q 30/02 705/37 |
| 2008/0010114 A1* | 1/2008 | Head | G06Q 30/00 705/14.1 |
| 2011/0029363 A1* | 2/2011 | Gillenson | G06Q 30/02 705/14.15 |
| 2011/0173059 A1* | 7/2011 | Benson | G06Q 30/02 705/14.24 |
| 2012/0109736 A1* | 5/2012 | Laor | G06Q 30/02 705/14.39 |
| 2012/0209686 A1* | 8/2012 | Horowitz | H04W 4/21 705/14.26 |
| 2012/0221395 A1* | 8/2012 | Bennett | G06Q 30/0207 705/14.23 |

(Continued)

*Primary Examiner* — Matthew T Sittner
(74) *Attorney, Agent, or Firm* — Alston & Bird LLP

(57) ABSTRACT

A method, apparatus and computer program product are provided for providing auto-replenishment of an inventory of promotions. Auto-replenishment amounts and dates may be determined based on a variety of factors including current inventory, outstanding promotions, redemption ratios and redemption rates. Redemption ratios and redemption rates may be characterized based on provider information, consumer information, and/or promotion information. Auto-replenishment may result in a smoothed redemption curve and optimal impact to the provider.

18 Claims, 7 Drawing Sheets

(56) References Cited

U.S. PATENT DOCUMENTS

| | | | |
|---|---|---|---|
| 2012/0310719 A1* | 12/2012 | Hammerstad | G06Q 30/0207 705/14.25 |
| 2013/0311262 A1* | 11/2013 | Hirson | G06Q 30/0207 705/14.23 |
| 2014/0111304 A1* | 4/2014 | Hashim-Waris | G06Q 30/0235 340/5.7 |
| 2014/0114741 A1* | 4/2014 | Genc-Kaya | G06Q 30/0242 705/14.41 |
| 2014/0278855 A1* | 9/2014 | Clark | G06Q 30/0211 705/14.13 |
| 2014/0279058 A1* | 9/2014 | Mullins | G06Q 30/0276 705/14.72 |
| 2017/0236141 A1* | 8/2017 | Forester | G06Q 30/0211 705/14.13 |

* cited by examiner

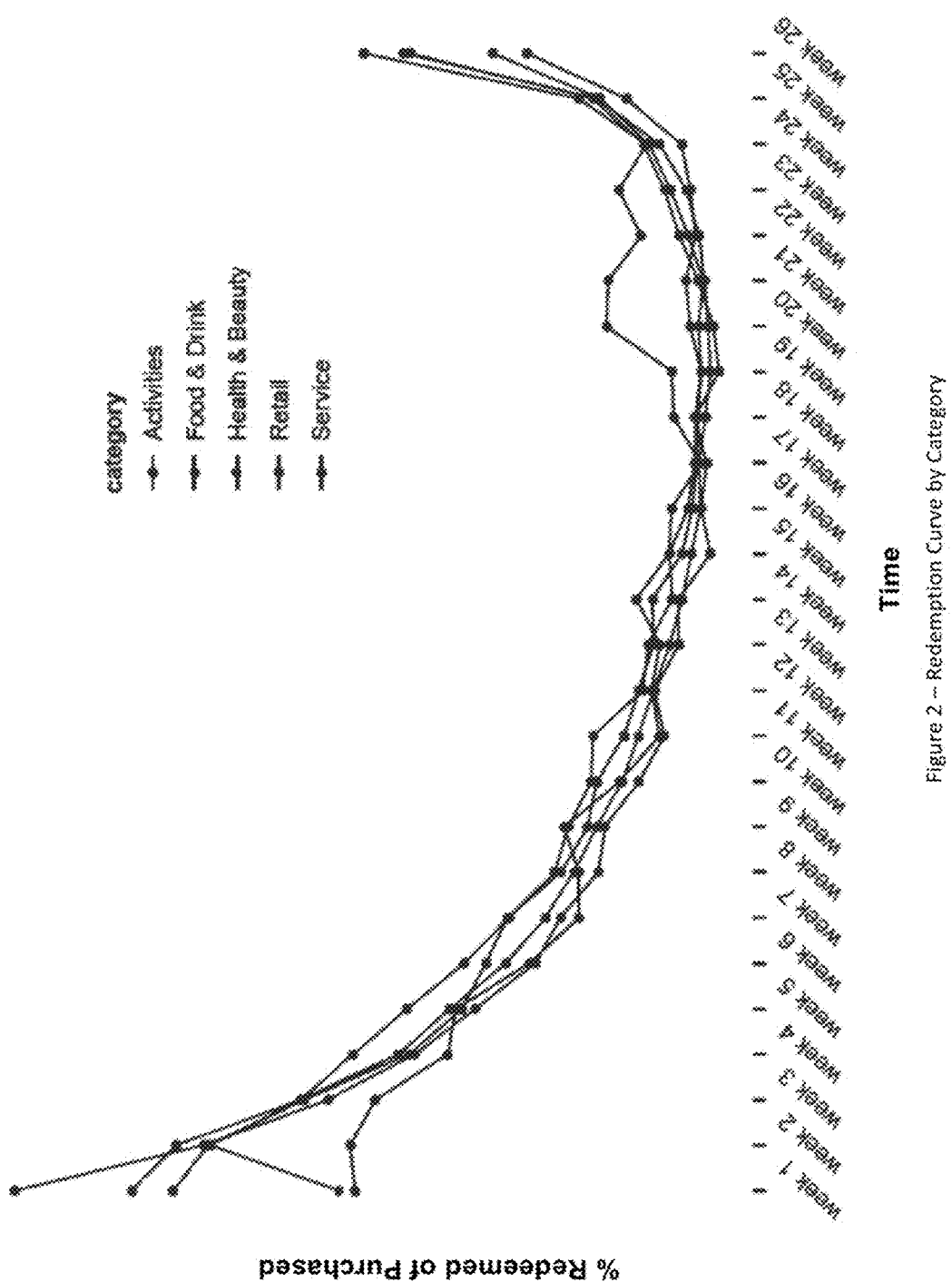
Figure 2 – Redemption Curve by Category

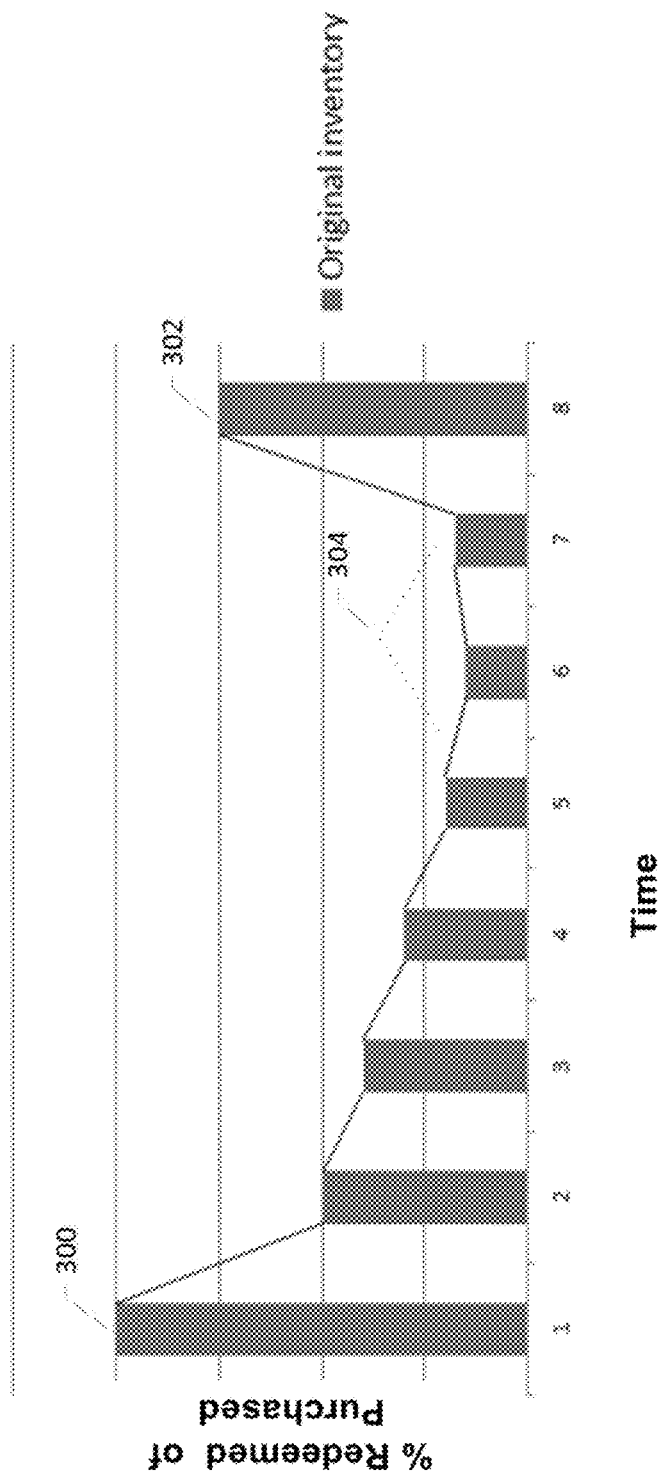
Figure 3A – Redemption Curve with no Auto-Replenishment

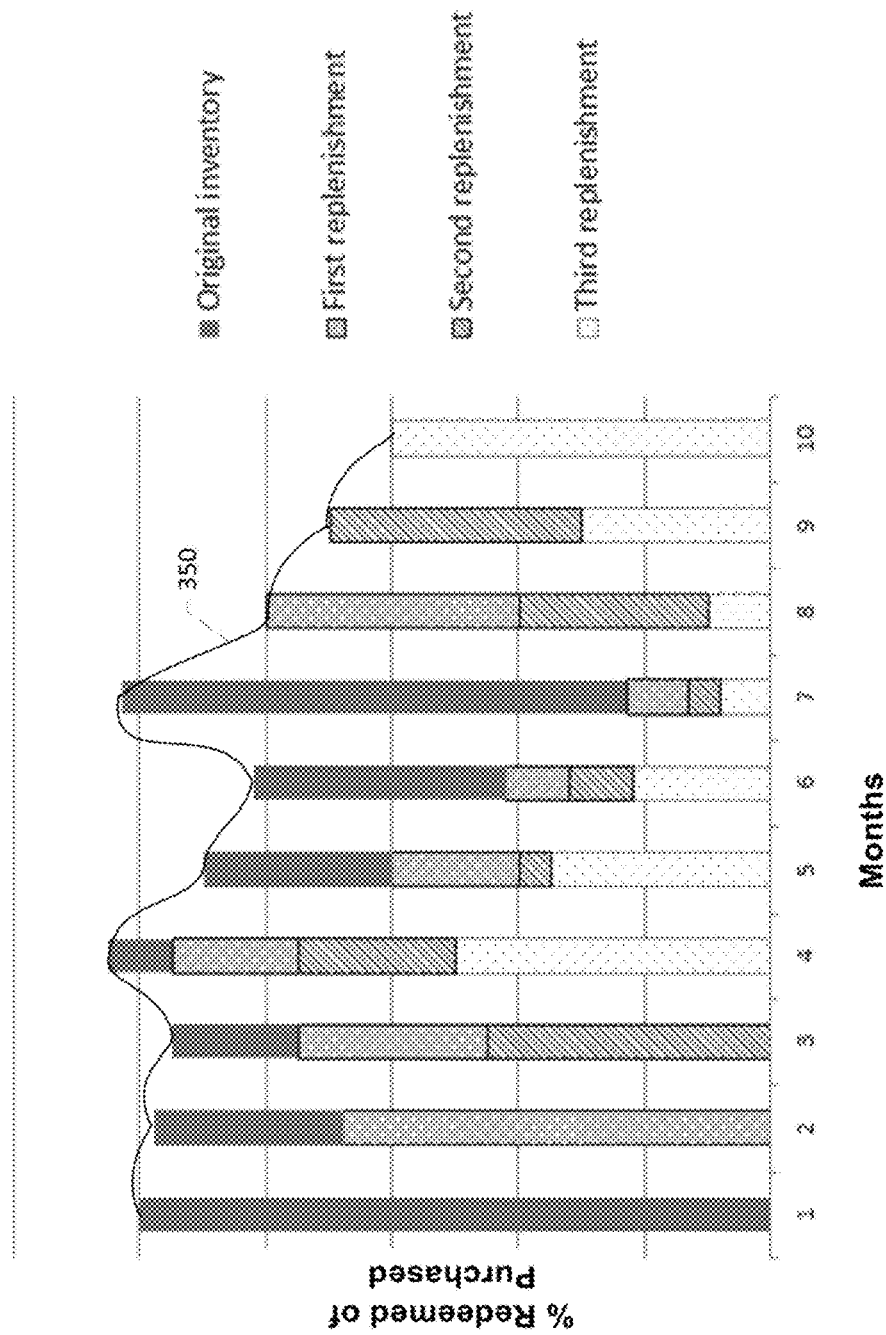
Figure 3B – Redemption Curve with Auto-Replenishment

METHOD, APPARATUS, AND COMPUTER PROGRAM PRODUCT FOR AUTO-REPLENISHING AN INVENTORY OF PROMOTIONS

CROSS REFERENCE TO RELATED APPLICATION

This application is a continuation of and claims the benefit of priority to U.S. application Ser. No. 14/494,053, filed Sep. 23, 2014, the entire contents of which are hereby incorporated by reference, and which claims the benefit of priority to U.S. Provisional Application No. 61/883,316, filed Sep. 27, 2013, the entire contents of which are also hereby incorporated by reference.

TECHNOLOGICAL FIELD

Various embodiments of the invention are related to promotional systems, and particularly to a method and apparatus for auto-replenishing an inventory of promotions.

BACKGROUND

Applicant has discovered problems with and related opportunities for improving inventory management of promotions. Through applied effort, ingenuity, and innovation, Applicant has solved many of these identified problems by developing a solution that is embodied by the present invention, which is described in detail below.

BRIEF SUMMARY

A method, apparatus, and computer program product are therefore provided for auto-replenishing an inventory of promotions offered for sale via a promotional system. A computer-implemented method for auto-replenishing an inventory of promotions for sale via a promotional system is provided, the method comprising receiving, from a provider, a target number of consumers to redeem a promotion at the provider within a predetermined period of time, receiving, from a provider, a target number of consumers to redeem a promotion at the provider within a predetermined period of time, accessing an inventory module configured to maintain and provide a current inventory of promotions and outstanding promotions available via the promotional system for redemption at the provider, accessing a redemption analytics module configured to generate a redemption curve reflecting redemption rates and redemption ratios, wherein the redemption analytics module is further configured to identify a redemption curve reflecting the redemption rates and the redemption ratios at the provider, calculating, with an auto-replenish calculator module, an optimal number of promotions, redeemable at the provider, with which to replenishment the inventory, wherein the promotions are redeemable at the provider, and the optimal number of promotions is calculated based on the target number, the current inventory and the outstanding promotions input from the inventory module, and the redemption curve reflecting the redemption rates and the redemption ratios input from the redemption analytics module, and causing an auto-replenishment of the inventory of promotions based on the calculation, wherein the auto-replenishment results in an increase in the current inventory of promotions redeemable at the provider and for sale via the promotional system.

In some embodiments, calculating the optimal number of promotions with which to replenish a promotion comprises defining the redemption curve based on at least one characteristic of the provider or the promotion, adjusting the redemption curve based on the current inventory and the outstanding promotions, identifying a number of expected redemptions to occur in a next time period, and calculating an additional inventory needed to satisfy the target number.

In some embodiments, the redemption curve is dependent on at least one of provider data, promotion data, historical redemption data or consumer data. The optimal number of promotions may be calculated further based on at least one of a corresponding purchase date or expiration date of the outstanding promotions.

In some embodiments, the method further includes calculating an estimate of repeat consumers to the provider following redemption of promotions, wherein the optimal number of promotions is calculated further based on the calculated estimate of repeat consumers. The redemption curve may predict a redemption rate and redemption ratio at the provider based on a redemption curve for a promotion at least one similar provider. The optimal number of promotions and/or instruments may be calculated further based on scheduling data collected by the promotional system on behalf of the provider. In some embodiments, the method further includes determining an optimal replenishment date, based on the target number, the current inventory, the outstanding promotions, and the redemption curve. In other examples, the replenishment date may be periodic.

In some examples, the method includes defining the redemption curve based on at least one characteristic of the provider or the promotion, the at least one characteristic comprising at least one of provider data, promotion data, or consumer data, adjusting the redemption curve based on the current inventory and the outstanding promotions, wherein the outstanding promotions comprise at least one of corresponding purchase dates or expiration dates of the outstanding promotions, calculating an estimate of repeat consumers to the provider following redemption of promotions, identifying a number of expected redemptions to occur in a next time period, calculating an additional inventory needed to satisfy the target number, accessing scheduling data collected by the promotional system and on behalf of the provider, and determining an optimal replenishment date, based on the target number, the current inventory, the outstanding promotions, and the redemption curve.

An apparatus for auto-replenishing an inventory of promotions for sale via a promotional system is provided, the apparatus comprising an auto-replenish calculator module configured to access a target number of consumers to redeem a promotion at a provider within a predetermined period of time, an inventory module configured to maintain and provide a current inventory and outstanding promotions, a redemption analytics module configured to generate a redemption curve reflecting redemption rates and redemption ratios, wherein the auto-replenish calculator module is configured to calculate an optimal number of promotions with which to replenishment the inventory, wherein the promotions are redeemable at the provider, and the optimal number of promotions is calculated based on the target number, the current inventory, the outstanding promotions, and the redemption curve reflecting the redemption rates and the redemption ratios, and cause an auto-replenishment of the inventory of promotions based on the calculation.

A computer program product for auto-replenishing an inventory of promotions for sale via a promotional system is provided, the computer program product comprising at least one non-transitory computer-readable storage medium having computer-executable program code instructions stored therein, the computer-executable program code instructions comprising a communications interface configured to: a) receive, from a provider, a target number of consumers to redeem a promotion at the provider within a predetermined period of time, b) provide a current inventory and outstanding promotions as maintained by an inventory module, and c) provide a redemption curve generated by a redemption analytics module based on redemption rates and redemption ratios; and an auto-replenish calculator module configure to a) calculate an optimal number of promotions with which to replenishment the inventory, wherein the promotions are redeemable at the provider, and the optimal number of promotions is calculated based on the target number, the current inventory, the outstanding promotions, and the redemption curve reflecting the redemption rates and the redemption ratios, and b) cause an auto-replenishment of the inventory of promotions based on the calculation.

Additional features and advantages of the present invention will be set forth in portion in the description which follows, and in portion will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE SEVERAL VIEWS OF THE DRAWINGS

FIG. 2 is a graph of example redemption curves showing redemptions of promotions over time and by category, according to an example embodiment;

FIG. 3A is a redemption curve showing redemptions of promotions over time without auto-replenishment, according to an example embodiment;

FIG. 3B is a redemption curve showing redemptions of promotions over time using auto-replenishment, according to an example embodiment;

DETAILED DESCRIPTION

Glossary

Figure 1:
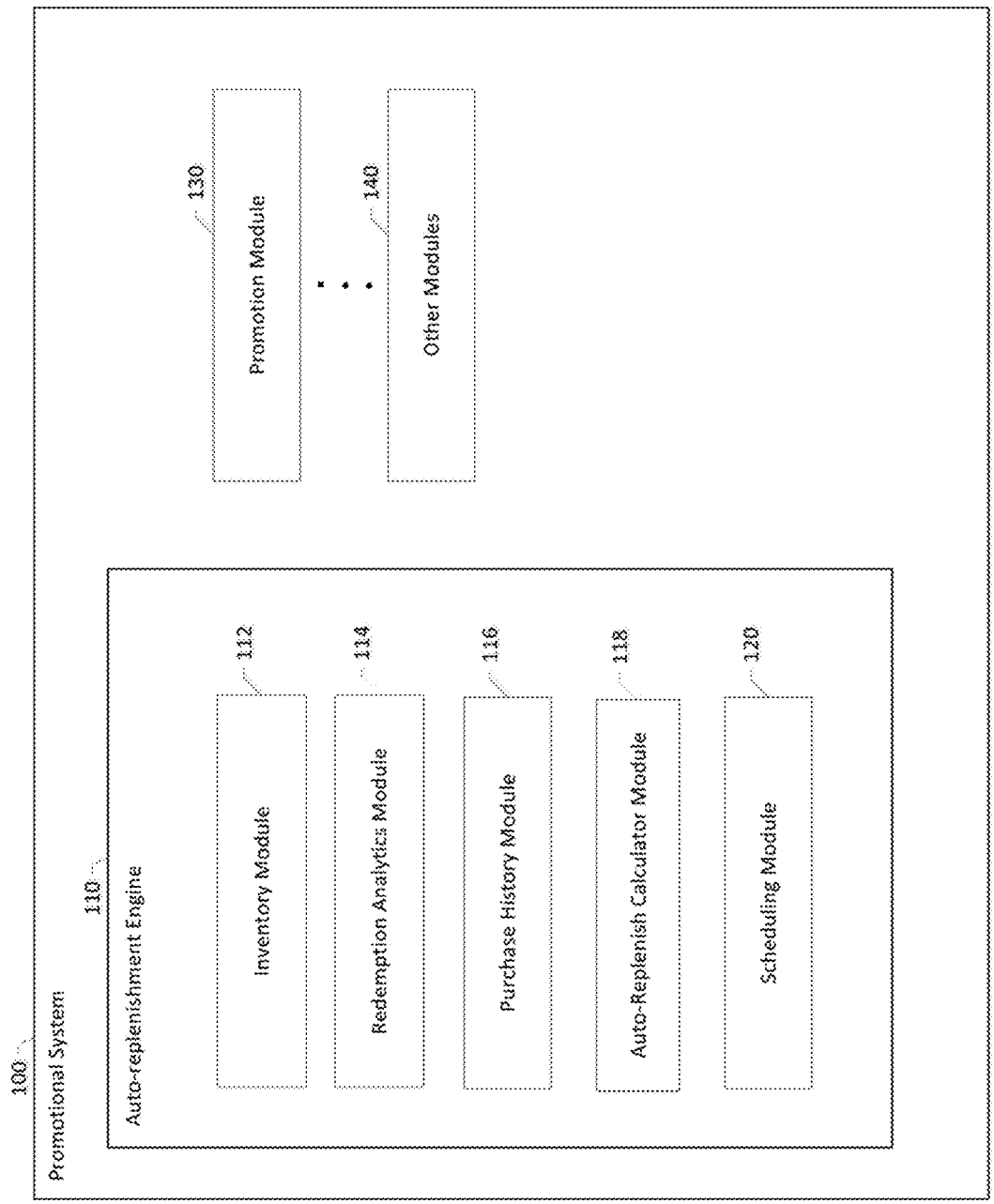
FIG. 1 is a schematic representation of a promotional system according to an example embodiment.

As used herein, the term "promotion and marketing service" may be defined as a service that is accessible via one or more computing devices and is operable to provide example promotion and/or marketing services on behalf of one or more providers that are offering one or more promotions that are redeemable for goods, services, experiences and/or the like. In some examples, the promotion and marketing service may take the form of a redemption authority, a payment processor, a rewards provider, an entity in a financial network, a promoter, an agent and/or the like.

As such, the service is, in some example embodiments, configured to present one or more promotions via one or more impressions, accept payments for promotions from consumers, issue promotions upon acceptance of an offer, participate in redemption, generate rewards, provide a point of sale device or service, issue payments to providers and/or or otherwise participate in the exchange of goods, services or experiences for currency, value and/or the like.

As used herein, the term "provider" may be defined as a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. One example provider may be a running company that sells attire for use by a person who runs or participates in athletic activities.

As used herein, the term "promotion" may be defined as any type of offered, presented or otherwise indicated reward, discount, coupon, credit, deal, incentive, discount, media or the like that is indicative of a promotional value or the like that upon purchase or acceptance results in the issuance of a promotion that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant promotion when redeemed at the provider), a residual value (e.g., the value upon return or upon expiry of one or more redemption parameters), one or more redemptions parameters and/or the like. Using the running company promotion as an example, the accepted value is $25 and the promotional value is $50. In this example, the residual value may be equal to the accepted value.

As used herein, the term "consumer" may be defined as a client, customer, purchaser, shopper, user or the like who may be in the position to or does exchange value for one or more promotions. For example, and using the aforementioned running company as the example provider, an individual who is interested in purchasing running shoes. A consumer may purchase a promotion via a promotional system and redeem the promotion at a provider.

As used herein, the term "instrument," or "promotional instrument" may be defined as a means by which promotions may be provided to consumers and redeemed and may represent and embody the terms of the promotion from which the instrument resulted. For example, instruments may include any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" may be defined as the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "target number" may refer to a desired number of consumers or consumer visits in a predefined period, such as 10 new consumers per month, or 100 consumer visits per month. The target number of consumers or consumer visits may be identified by the provider and communicated to the promotion and marketing service. The provider may consider its established consumer base and may therefore provide a target number based on a desired number of new consumers it wishes to add.

As used herein, the term "current inventory" may refer to a number of currently offered promotions and/or instruments, such as the number of instruments available to consumers for purchase, the number of instruments that may be offered by the promotion and marketing service and/or the like. The current inventory may be related to any promotions and/or instruments redeemable at the provider, which may not necessarily be associated with the same promotion, for example.

As used herein, the term "outstanding promotion" may be defined as purchased promotions which have not yet been redeemed. The outstanding promotions may have been previously purchased via the promotional system, thereby depleting current inventory. Purchase dates and expiration dates of the outstanding promotions may also be considered to impact calculate optimal replenishment rates.

As used herein, the term "redemption ratio" may be defined as a percentage of purchased promotions that are redeemed. For example, if 50 promotions are purchased, and as a result 25 promotions are redeemed by consumers, the promotion redemption ratio is 25 promotion redemptions for every 50 promotions purchased or 50%. In some embodiments, redemption ratios may be actual redemption ratios based on collected or known redemption data. In some embodiments, redemption ratios for a particular promotion may be predicted based on a variety of factors, as described herein.

As used herein, the term "redemption rate" may be defined as a rate per unit time at which purchased promotions are redeemed. For example, if 100 promotions are redeemed by consumers in a 10 day span, the redemption rate may be described as 10 redemptions per day. In some embodiments, redemption rates may be actual redemption rates based on collected or known redemption data. In some embodiments, redemption rates for a particular promotion may be predicted based on a variety of factors, as described herein.

As used herein, the term, "redemption curve" may be defined as any data describing and/or impacting the redemption of promotions. For example, a redemption curve may be generated based on redemption ratios and/or redemption rates over time. Example redemption curves are provided and described herein with reference to FIGS. 2, 3A, and 3B.

Overview

In some examples, a promotion and marketing service may offer a promotion on behalf of a provider to promote the provider and assist in increasing consumer traffic and/or business for the provider. In some examples, the offering of a promotion available for redemption at a particular provider may result in an increase in the number of consumers who visit the provider, request services from that provider or the like. In some examples, that increase in consumer interest may be a welcomed bump to the provider, whereas in other examples, the increase in consumer interest may overwhelm available supply, available resources or the like. For example, a small boutique that would safely accommodate 15 consumers may not benefit from a rush of 50 consumers on a given day. In some examples, such a drastic increase in customers may be detrimental to the provider and may ultimately result in lost business, dissatisfied consumers and/or the like.

Additionally, and in some examples, the promotion and marketing service may maintain a bank or inventory of promotions that may be offered to consumers over a given amount of time. Such an inventory of promotions may advantageously enable the promotion and marketing service to consistently offer particular types of promotions, may allow certain promotions to be varied and/or the like. Because the promotion and marketing service may have a large inventory, it may then sell a number of promotions on a given day or during a given time period that may result in a detrimental result, such as the detrimental result described above, to the provider or the like.

As such, the method, apparatus and computer program product described herein is configured to provide, auto-replenishment of an inventory of instruments. Example embodiments may produce smoother redemption curves and optimize the impact of a promotion to the provider by providing increased consumer traffic at an optimal level. Extensive data relating to sales, marketing, and consumer analytics may be in constant flux. Providing a streamlined automated approach to replenishing inventories may alleviate an otherwise tedious task of analyzing the impact to providers introduced by promotional offerings and provide for a precise and optimized inventory management.

In some example embodiments, the method, apparatus and computer program product described herein is configured to provide or otherwise inform an auto-replenishment process of an inventory of promotions for a particular provider or for a group of providers, such as those made available for sale on a promotional system. In some example embodiments, the auto-replenishment process may function to replenish the number of promotions in an inventory. Then, using the number of promotions in inventory as the regulator, the promotion and marketing service may cause the advantageous effect of metering the number of consumers visiting or otherwise requesting services from the provider.

In some examples, and as is described herein, the providers themselves may define a target number of consumers that the provider wants to redeem a promotion during a particular time period. In response, the promotion and marketing system may for example, auto-replenish an inventory for that particular promotion to control the number of redemptions, to limit the number of redemptions in the predetermined period to be under the provider defined consumer limit or the like.

For example, the provider may identify the need for 50 additional consumers a month (e.g., the predetermined time period) as its target number. As such, the promotion and marketing service may offer 200 promotions initially to achieve the target of 50 consumers a month based on a number of factors described herein. The promotion and marketing service may then replenish the inventory over time, on a repeated basis, and/or at an irregular internal. The day or time to replenish the inventory and/or the number of promotions to offer may be calculated based on a variety of factors, including, but not limited to, a target number of consumers the provider would like to redeem a promotion, currently inventory, outstanding promotions, and a redemption curve (e.g., redemption rates, and/or redemption ratios). As such, in second month, the promotion and marketing service may only auto-replenish and offer 50 promotions to achieve or satisfy the target of 50 consumers a month.

Technical Underpinnings and Implementation of Exemplary Embodiments

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the other computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Using the concepts introduced above, and described in further detail herein, the promotional system may be configured to perform auto-replenishment of promotions, therefore optimizing the impact of a promotion to the provider.

FIG. 1 is a schematic representation of a promotional system according to an example embodiment. A promotion and marketing service may offer its services via a promotional system 100, accessible via one or more computing devices. In some example embodiments, a promotional system 100 may include an auto-replenishment engine 110, promotion module 130, and/or other modules 140. The components of the promotion module 130, along with other modules 140 are configured to provide various logic (e.g. code, instructions, functions, routines and/or the like) and/or services related to providing promotions to consumers.

The auto-replenishment engine 110 may be configured to manage inventory of promotions with the inventory module 112, provide redemption analytics data with the redemption analytics module 114, and/or provide purchase history information with the purchase history module 116. Additionally or alternatively, the auto-replenishment engine 110 may be configured to calculate an optimal number of promotions or promotional instruments with which to replenish an inventory with auto-replenish calculate module 118, and/or to predict future consumer visits and/or redemption rates with scheduling module 120.

The promotional system 100 may therefore be configured to provide promotions to consumers, and to provide auto-replenishing of the promotions to optimize consumer traffic to a provider.

FIG. 2 is a graph of redemption curves showing redemptions of promotions over time and by category, according to an example embodiment. The example redemption curves show redemptions of promotions purchased approximately during the same week and having a 26 week availability period (e.g., the promotional value of the promotion expires after 26 weeks). The graph contains five separate curves, each of the curves representing historical data collected from multiple promotions classified by provider category. The points on a curve each represent the weekly percent of redemptions of the total number of promotions purchased.

The redemption curve may therefore convey information relating to redemption ratios and redemption rates. For example, the redemption curve illustrates redemption rates as the redemption curve explicitly illustrates a percent of redemptions in a specified time period (e.g., per week). Redemption ratios may also be inferred from the redemption curve as a cumulative percentage of redemptions during the promotion expiration.

A redemption curve therefore provides a model of how consumers redeem promotions. For example, all of the redemption curves illustrate that, in general, consumers do not redeem promotions at a constant rate. In general, the redemption rate may be greater during the beginning and ending weeks of promotion availability. Additionally or alternatively, a redemption curve can be used to model consumer redemption behavior with respect to a promotion category. In the example, there are variations in the shapes of particular curves.

The redemption curves by category are provided merely as examples. Any number of factors may be considered in a redemption curve, such as may be provided by the redemption analytics module 114. For example, redemption curves may be impacted by any data relating to providers, consumers, and/or promotions.

Provider data impacting redemption curves may include but is not limited to categories and/or subcategories of a provider's business and/or location. For example, providers located in remote locations may experience a peak in redemptions toward the end of promotion availability, while those located in bustling cities may experience a peak in redemptions soon after an offering. Providers in the restaurant business may experience redemption peaks and different points in an availability period, than say, a salon. Some providers may even be identified as a "hot" provider, resulting in peak redemption rates early during promotion availability, and maximized redemption ratios. In some embodiments, the promotional system 100, such as with scheduling module 120, may even maintain scheduling data (e.g., scheduling information for consumer appointments or reservations at the provider) on behalf of a provider, which may impact a redemption curve.

Attributes relating to the consumer may also be reflected in a redemption curve. Particular consumers and/or groups of consumers (e.g., based on consumer characteristics that may be collected in a user profile or by another method) may have a history of redeeming promotions early in the availability period, while others may have a habit of waiting until days before expiration. Additionally or alternatively, a consumer who actively sought out a promotion (e.g., by searching the promotional system 100) may generally redeem promotions sooner than a consumer who purchased a promotion as result of receiving an email and/or mobile push notification.

Promotion data may additionally or alternatively impact a redemption curve. For example, a higher-cost (e.g., accepted value) promotion may be redeemed sooner and/or at a higher redemption ratio than a lower-cost promotion. The service type being offered may also impact redemption curves. Promotions for getaways may be redeemed late in an availability period to do necessary planning required for travel. Fast food promotions may generally be redeemed sooner than fine dining promotions. Seasonality of services offered may also impact redemption curves. For example, a promotion for outdoor-related activities or gear may have high redemption rates during summer months.

The provider, consumer, and promotion data described above is provided merely as an example, and it will be appreciated that any information available to the promotional system 100 may be reflected in a redemption curve (e.g., redemption ratios and/or redemption rates).

FIG. 3A is a redemption curve showing redemptions of promotions over time without auto-replenishment. The redemption curve is similar to the redemption curves of FIG. 2. The curve 300 shows peaks and valleys in redemption rates, such as peaks 300 and 302, and valley 304. The drastic changes in redemptions over time may be detrimental to a provider who desires a steady flow of consumers.

FIG. 3B is a redemption curve showing redemptions of promotions over time using auto-replenishment, according to an example embodiment. Using auto-replenishment methods described herein, the promotional system 100 may offer an original inventory of promotions. In month 1, all redemptions of promotions may be traced to the original inventory. In month 2, the promotional system 100, such as with auto-replenishment engine 110, may replenish the inventory with a first replenishment. As such, redeemed promotions during month 2 may be traced to the original inventory or first replenishment. In month 3, a second replenishment may occur. As such, redemptions occurring in month 3 may be traced to the original inventory, first replenishment, or second replenishment. In month 4, a third replenishment may occur. Redemptions occurring in month 4 may therefore be traced to the original inventory, first replenishment, second replenishment, or third replenishment.

The original inventory and three replenishments represented in the redemption curve provide promotions having a 7-month availability (e.g., the promotion may expire 7 months after the offer and/or purchase date). A redemption curve based on any of the original inventory or replenishments alone may resemble the redemption curve of FIG. 3A, having sharp peaks and valleys. However, the redemption curve 350 based on cumulative redemptions from the original inventory and first, second, and third replenishments, show a smoother redemption curve. As such, the auto-replenishment methods described herein may result in optimal consumer traffic to the provider.

It will be appreciated that while the example redemption curve of FIG. 3B illustrates monthly auto-replenishments, any time period of auto-replenishment may be provided, and in some instances, auto-replenishment may even occur at staggered time intervals. Similarly, while the promotions provided in the original inventory and three replenishments have a 7-month availability, not every original inventory and replenishment may include promotions having the same availability. In some examples, promotions made available during the same replenishment may even have differing availability periods.

Figure 4:
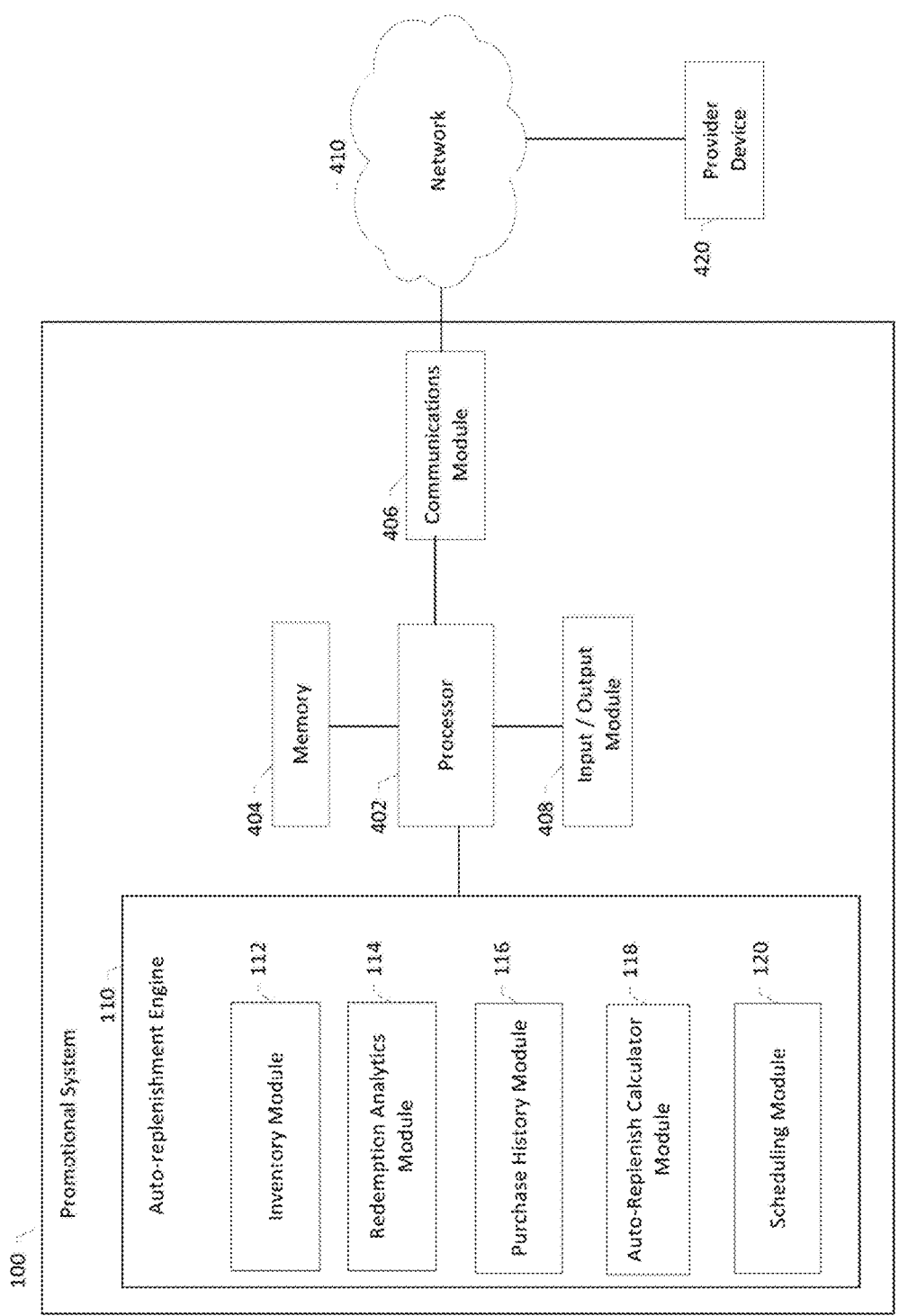
FIG. 4 is a schematic representation of a promotion and marketing service environment according to an example embodiment.
Figure 5:
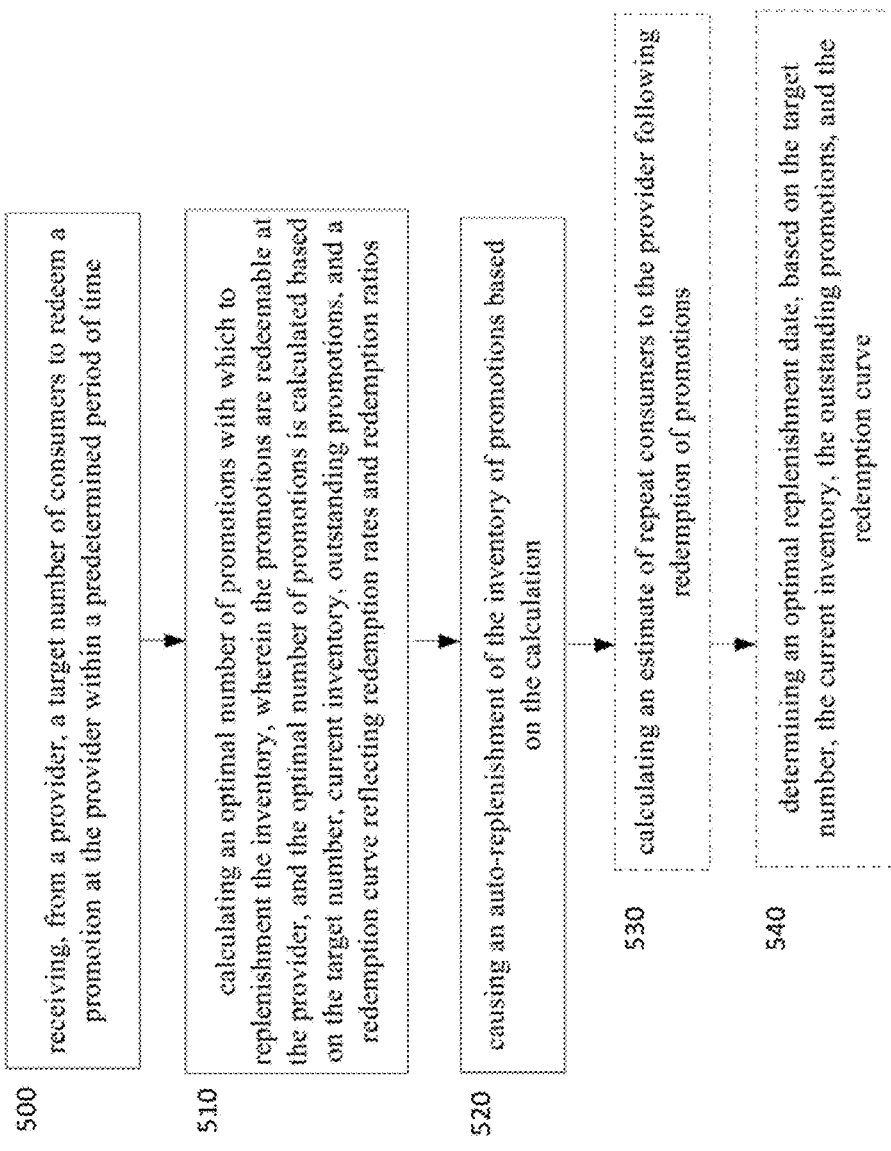
FIG. 5 is a flowchart of operations for providing auto-replenishment of promotions according to an example embodiment.

Having now provided example redemption curves, FIGS. 4 and 5 describe in further detail the systems and corresponding components configured to provide the auto-replenishment methods described herein.

FIG. 4 is a schematic representation of a promotion and marketing service environment according to an example embodiment. Promotional system 100 may include, for example, auto-replenishment engine 110, processor 402, memory 404, communications module 406, input/output module 408, and may communicate with a provider device 420 over network 410.

Promotional system 100 may be coupled to one or more provider devices 420 via network 410. In this regard, network 410 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 410 may include a cellular telephone, an 802.11, 802.16, 802.20, and/or WiMax network. Further, the network 410 may include a public network, such as the Internet, a private network, such as an intranet, or combinations thereof, and may utilize a variety of networking protocols now available or later developed including, such as, but not limited to, TCP/IP based networking protocols.

Provider device 420 may be implemented as a personal computer and/or other networked device, such as a cellular phone, tablet computer, mobile device, etc., that may be used for accessing promotional system 100 to provide a target number of consumers, for example. In some embodiments, promotion information such as an authorization to auto-replenish promotions, may be transmitted from a provider device 420 to the promotional system 100.

In some embodiments, promotional system 100 may include auto-replenishment engine 110, including redemption module 112, redemption analytics module 114, purchase history module 116, auto-replenish calculator module 118, and/or scheduling module 120. As referred to herein, the term "module" includes hardware, software and/or firmware configured to perform one or more particular functions. In this regard, promotional system 100 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 404) that is executable by a suitably configured processing device (e.g., processor 402), or some combination thereof.

Processor 402 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some embodiments, processor 402 comprises a plurality of processors. The plurality of processors may be embodied on a single computing device or may be distributed across a plurality of computing devices collectively configured to function as promotional system 100. The plurality of processors may be in operative communication with each other and may be collectively configured to perform one or more functionalities of promotional system 100 as described herein. In an example embodiment, processor 402 is configured to execute instructions stored in memory 404 or otherwise accessible to processor 402. These instructions, when executed by processor 402, may cause promotional system 100 to perform one or more of the functionalities of promotional system 100 as described herein.

Whether configured by hardware, firmware/software methods, or by a combination thereof, processor 402 may comprise an entity capable of performing operations according to embodiments of the present invention while configured accordingly. Thus, for example, when processor 402 is embodied as an ASIC, FPGA or the like, processor 402 may comprise specifically configured hardware for conducting one or more operations described herein. As another example, when processor 402 is embodied as an executor of instructions, such as may be stored in memory 404, the instructions may specifically configure processor 402 to perform one or more operations described herein, such as those discussed herein.

Memory 404 may comprise, for example, volatile memory, non-volatile memory, or some combination thereof. Although illustrated in FIG. 4 as a single memory, memory 404 may comprise a plurality of memory components. The plurality of memory components may be embodied on a single computing device or distributed across a plurality of computing devices. In various embodiments, memory 404 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In some embodiments, memory 404 may comprise one or more databases configured to store consumer data, promotion data, redemption data, provider data, analytics data, and/or any other data accessed by promotional system 100, and may be implemented as any suitable network database, backend data server, cloud computing device, among other things. Memory 404 may be configured to store information, data, applications, instructions, or the like for enabling promotional system 100 to carry out various functions in accordance with example embodiments of the present invention. For example, in at least some embodiments, memory 404 is configured to buffer input data for processing by processor 402. Additionally or alternatively, memory 404 may be configured to store program instructions for execution by processor 402. Memory 404 may store information in the form of static and/or dynamic information. This stored information may be stored and/or used by promotional system 100 during the course of performing its functionalities.

Communications module 406 may be embodied as any device or means embodied in circuitry, hardware, a computer program product comprising computer readable program instructions stored on a computer readable medium (e.g., memory 404) and executed by a processing device (e.g., processor 402), or a combination thereof that is configured to receive and/or transmit data from/to another device, such as, for example, a second promotional system 100 and/or the like. In some embodiments, communications module 406 (like other components discussed herein) can be at least partially embodied as or otherwise controlled by processor 402. In this regard, communications module 406 may be in communication with processor 402, such as via a bus. Communications module 406 may include, for example, an antenna, a transmitter, a receiver, a transceiver, network interface card and/or supporting hardware and/or firmware/software for enabling communications with another computing device. Communications module 406 may be configured to receive and/or transmit any data that may be stored by memory 404 using any protocol that may be used for communications between computing devices. Communications module 406 may additionally or alternatively be in communication with the memory 404, input/output module 408, and/or any other component of promotional system 100, such as via a bus.

Input/output module 408 may be in communication with processor 402 to receive an indication of a user input and/or to provide an audible, visual, mechanical, or other output to a user (e.g., internal user, provider, and/or consumer). As such, input/output module 408 may include support, for example, for a keyboard, a mouse, a joystick, a display, a touch screen display, a microphone, a speaker, a RFID reader, barcode reader, biometric scanner, and/or other input/output mechanisms. In embodiments wherein promotional system 100 is embodied as a server or database, aspects of input/output module 408 may be reduced as compared to embodiments where promotional system 100 is implemented as an end-user machine (e.g., provider device) or other type of device designed for complex user interactions. In some embodiments (like other components discussed herein), input/output module 408 may even be eliminated from promotional system 100. Alternatively, such as in embodiments wherein promotional system 100 is embodied as a server or database, at least some aspects of input/output module 408 may be embodied on an apparatus used by a user that is in communication with promotional system 100, such as for example, internal user device 420 and/or consumer device 420. Input/output module 408 may be in communication with the memory 404, communications module 406, and/or any other component(s), such as via a bus. Although more than one input/output module and/or other component can be included in promotional system 100, only one is shown in FIG. 4 to avoid overcomplicating the drawing (like the other components discussed herein).

In some embodiments, some or all of the functionality otherwise performed by auto-replenishment engine 110 may be performed by processor 402. In this regard, the example processes discussed herein can be performed by at least one processor 402 and/or a module of auto-replenishment engine 110. For example, non-transitory computer readable storage media can be configured to store firmware, one or more application programs, and/or other software, which include instructions and other computer-readable program code portions that can be executed to control each processor (e.g., processor 402, auto-replenishment engine 110 and/or a module of the auto-replenishment engine 110) of the promotional system 100 to implement various operations, including the examples shown below. As such, a series of computer-readable program code portions are embodied in one or more computer program products and can be used, with a computing device, server, and/or other programmable apparatus, to produce machine-implemented processes.

FIG. 5 is a flowchart of operations for providing auto-replenishment of promotions according to an example embodiment. Some operations, such as those bordered by a dashed line, may be optional. As shown by operation 500, the promotion system 100, may be configured, with auto-replenishment engine 110, for example, for receiving, from a provider, a target number of consumers to redeem a promotion at the provider within a predetermined period of time. In this regard, the provider may take into consideration current consumer traffic flow, and may communicate to the promotional system 100, such as with provider device 420, a target number of consumers by which the provider desires to increase its consumer visits per a predefined unit of time, such as 20 consumers per month. In some embodiments, the target number may be defined by a range, such as 20-30 consumers per month.

As shown by operation 510, the promotion system 100, may be configured, with auto-replenishment engine 110, for example, for calculating an optimal number of promotions with which to replenishment the inventory, wherein the promotions are redeemable at the provider, and the optimal number of promotions is calculated based on the target number, current inventory, outstanding promotions, and a redemption curve reflecting redemption rates and redemption ratios. As described above, the auto-replenishment engine 110, such as with auto-replenish calculator module 118, may access any information available to the promotional system 100 to calculate the optimal number of promotions with which to replenish the inventory. The auto-replenish calculator module 118 may therefore utilize the inventory module 112 to assess current inventories of promotions that are redeemable at the provider (which may be related to the same or different promotions). Additionally or alternatively, the auto-replenish calculator module 118 may utilize the redemption analytics module 114 to assess redemption curves that model data based on a variety of factors, examples of which are provided herein, and may relate to provider data, promotion data, and/or consumer data. As such, redemption curves describing redemption data for other promotions (e.g., promotions associated with similar services, providers, provider categories, provider subcategories, etc.) may be considered a prediction for redemption of a promotion for which replenishment is to be calculated. The auto-replenish calculator module 118 may further refer to the purchase history module 116 to assess outstanding promotions that were purchased but not yet redeemed. In some embodiments, the auto-replenish calculator module 118 may utilize the scheduling module 120 to assess scheduling information maintained by the promotional system 100 for appointments, classes, and/or reservations scheduled by consumers at the provider. If the scheduling module 120 indicates a solidly booked schedule, for example, the auto-replenishment calculator 118 may decrease the optimal number of promotions with which to replenish the inventory. A schedule with many gaps may result in an increased optimal number of promotions with which to replenish the inventory.

In some embodiments, and as described above, the auto-replenish calculator module 118 may utilize any information made available to the promotional system 100. In some embodiments, the optimal number of promotions with which to replenish an inventory may be calculated as the target number minus expected redemptions from current inventory and/or outstanding promotions. The expected redemptions from current inventory and outstanding promotions may be estimated based on a redemption curve, for example. Calculating an optimal number of promotions with which to replenish the inventory is described in further detail with respect to FIG. 6. As shown by operation 520530, the promotion system 100, may be configured, with auto-replenishment engine 110, for example, for causing an auto-replenishment of the inventory of promotions based on the calculation.

As shown by operation 530, the promotion system 100, may be configured, with auto-replenishment engine 110, for example, for calculating an estimate of repeat consumers to the provider following redemption of promotions. For some providers, the ultimate goal of offering promotions in partnership with the promotion and marketing service may be to generate not only a one-time visit as a result of a consumer purchasing a promotion, but to also generate repeat business from those consumers. Therefore, the redemption analytics module 114, for example, may model predictions of repeat business following redemption. Additionally or alternatively, the lag time between repeat consumer visits may also be analyzed. For example, some services or provider categories, such as salons, may experience a high rate of repeat consumers, but with a repeat lag time of 6-8 weeks. A lawn mowing service, however, may experience an average rate of repeat business, but with a repeat lag time of only 1 week. A fine dining restaurant, on the other hand may experience a much lower repeat business rate than a salon or lawn mowing service. Any estimates or predictions relating to repeat business may be utilized by the auto-replenish calculator module 118 in calculating the optimal number of promotions with which to replenish an inventory.

As shown by operation 540, the promotional system 100, may be configured, with auto-replenishment engine 110, for example, for determining an optimal replenishment date, based on the target number, the current inventory, the outstanding promotions, and the redemption curve. In some embodiments, a replenishment date may be additionally be optimized by the auto-replenish calculator module 118, based on any of the factors described herein. In example embodiments, auto-replenishment is described to occur on a monthly or other repeat basis. However, it will be appreciated that auto-replenishment may beneficially occur at irregular intervals. For example, auto-replenishment engine 110, while calculating auto-replenishment for a promotion at a fine dining restaurant, may strategically identify a one-time auto-replenishment date three weeks before Valentine's Day. As another example, the auto-replenishment engine 110 may react to updates to a provider's schedule, as provided by the scheduling module 120, to auto-replenish inventory on specific dates.

Figure 6:
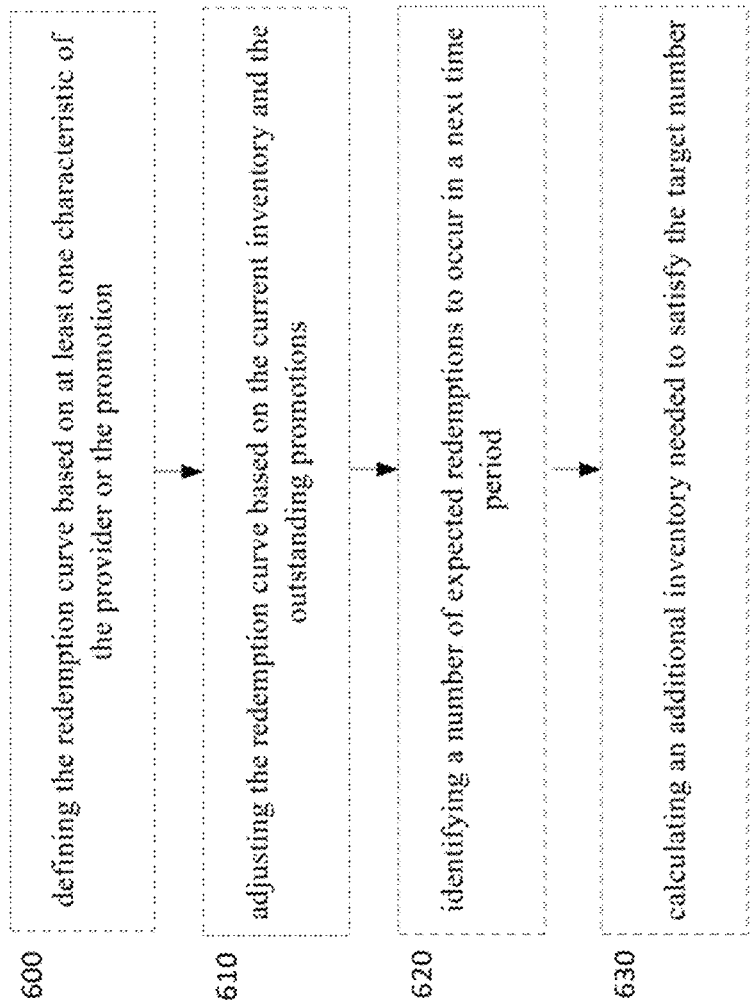
FIG. 6 is a flowchart of operations for calculating an optimal number of promotions with which to replenish an inventory according to an example embodiment.

FIG. 6 is a flowchart of operations for calculating an optimal number of promotions with which to replenish an inventory according to an example embodiment. As shown by operation 600, the promotional system 100, may be configured, with redemption analytics module 114 and/or auto-replenish calculator module 118, for example, for defining the redemption curve based on at least one characteristic of the provider or the promotion. As such, a known or predetermined redemption curve may be identified as a predictor for the redemption curve of the inventory to be replenished. The redemption curve may be defined based on a prior promotion having similar characteristics and/or another provider having similar characteristic to the provider associated with the inventory to be replenished. In some embodiments, the redemption curve may actually be a redemption curve for the same provider, based on a previously offered promotion, for example.

As shown by operation 610, the promotional system 100, may be configured, with redemption analytics module 114 and/or auto-replenish calculator module 118, for example, for adjusting the redemption curve based on the current inventory and the outstanding promotions. In some embodiments, the redemption curve may be additionally adjusted to reflect any redeemed promotions. As such, a beginning portion of the redemption curve (e.g., the portion of the redemption curve representing redemptions made in the past) may reflect actual and accurate data, while a latter portion of the redemption curve (e.g., the portion of the redemption curve representing redemptions in the future) may be a predictor for redemptions that may occur in the future.

As shown by operation 620, the promotional system 100, may be configured, with redemption analytics module 114 and/or auto-replenish calculator module 118, for example, for identifying a number of expected redemptions to occur in a next time period. The curve may be fit to take into consideration the current inventory and/or the outstanding promotions such as by estimating the percentage or number of the current inventory and/or outstanding promotions to be redeemed in a next time period. The number of expected redemptions to occur may be estimated based on previous promotions and/or redemption data including redemption ratios and redemption rates based on another promotion's current inventory and/or outstanding promotions at one moment in time, for example.

As shown by operation 630, the promotional system 100, may be configured, with redemption analytics module 114 and/or auto-replenish calculator module 118, for calculating an additional inventory needed to satisfy the target number. For example, the redemption curve may be fit to coincide with the target number, based on known (e.g., previously redeemed promotions represented on the beginning portion of the redemption curve) or predicted data points (e.g., predicted redemptions represented on the latter portion of the redemption curve) relating to the promotion to be replenished. The redemption curve may therefore be further adjusted so as to reach the target number at any or all points in time in the future. The additional inventory needed to satisfy (e.g., not exceed the target number, meet the target number or exceed the target number) the target number may therefore be calculated based on the gap of the fit curve to the previously adjusted curve (adjusted based on current inventory and outstanding promotions). Said differently, the additional inventory needed to satisfy the target number may be calculated by subtracting the number of expected redemptions for a time period from the target number of redemption for the time period.

The methods described herein for calculating the optimal number of promotions with which to replenish an inventory are provided merely as examples. The vast amount of data that may be collected by the promotional system 100 may enable the redemption analytics module 114 and/or auto-replenish calculator module 118 to implement various algorithms, regression analysis, machine learning (supervised or unsupervised), interpolation, smoothing and/or the like to calculate the optimal number of promotion with which to replenish an inventory. As such, the example methods provided herein are not intended to limit the scope of the calculation in any way.

As described herein, the auto-replenishment functionality provided by promotional system 100 may produce smoother redemption curves and optimize the impact of a promotion to the provider by providing increased consumer traffic at an optimal level. The improved experience for the provider may result in increased contracts between providers and the promotion and marketing service, thereby increasing revenue for the promotion and marketing service As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus circuitry to produce a machine, such that the computer, processor, or other programmable circuitry that executes the code on the machine creates the means for implementing various functions, including those described herein.

It is also noted that all or some of the information presented by the example displays discussed herein can be based on data that is received, generated and/or maintained by one or more components of promotional system 100. In some embodiments, one or more external systems (such as a remote cloud computing and/or data storage system) may also be leveraged to provide at least some of the functionality discussed herein.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 402, and/or auto-replenishment engine 110 discussed herein, to produce a machine, such that the computer program product includes the instructions which execute on the computer or other programmable data processing apparatus create a means for implementing the functions specified in the flowchart block or blocks.

These computer program instructions may also be stored in a computer-readable storage medium (e.g., memory 404) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method for improving consumer traffic attributed to an inventory of promotions offered for sale at a given time via an inventory module of a promotional system, wherein the method is implemented by an auto-replenishment engine for auto-replenishing the inventory of promotions, the method comprising:
    with at least a processor of the promotional system, accessing scheduling data relating to scheduled services and availability of a provider;
    with the processor, generating target data from the accessed scheduling data by applying the scheduled services and the availability to calculate a target number of consumers to redeem a promotion at the provider within a predetermined period of time;
    accessing the inventory module, configured to maintain and provide, in a database, a current inventory of promotions and outstanding promotions available via the promotional system for redemption at the provider, wherein the promotions and the outstanding promotions have associated promotional value and cost, and the outstanding promotions have been purchased by consumers and have associated service types;
    accessing a redemption analytics module of the promotional system, wherein the redemption analytics module is configured to generate, with the processor, a redemption curve of historical redemptions by identifying a promotion category, inputting data relating to historical promotions having a similar promotion category, and calculating a redemption ratio;
    fitting the redemption curve of the historical redemptions by multiplying the redemption ratio for each time period by the sum of the current inventory and the outstanding promotions such that the fitted redemption curve reflects expected redemptions during respective time periods between the respective purchase dates and expiration dates;
    calculating, with an auto-replenish calculator module implemented by at least the processor, a number of promotions to be made available for purchase and redeemable at the provider for particular associated services types, with which to replenishment the inventory, and respective replenishment dates of the number of promotions by incorporating the target number into the fit redemption curve of the historical redemptions reflecting the redemption rates and the redemption ratios input from the redemption analytics module; and
    transmitting data to the inventory module such that the inventory module causes an increase in the current inventory of promotions in the database redeemable at the provider and for sale via the promotional system on the respective replenishment dates.

2. The method of claim 1, wherein generating the redemption curve of historical redemptions further comprises:
    identifying the promotion category based on service types, the associated promotional value and the cost for the current inventory of promotions;
    inputting data relating to outstanding historical promotions in an instance in which the historical promotions have a similar promotion category to the identified promotion category; and
    calculating the redemption ratio and a redemption rate for the provider for a plurality of time periods, such that the redemption ratio is a percentage of historical redemptions relative to outstanding historical promotions and the respective historical expiration dates, and the redemption rate is as a rate per unit of time at which purchased promotions are redeemed.

3. The method of claim 1, further comprising:
    generating predicted future redemption rates by processing the scheduling data, the scheduled services, and the associated service types.

4. The method of claim 1, further comprising:
    determining seasonality of associated service types and incorporating the seasonality of the associated services types into the fit redemption curve.

5. The method of claim 1, further comprising:
    calculating an estimate of repeat consumers to the provider following redemption of promotions, wherein the number of promotions and the respective replenishment dates are calculated further based on the calculated estimate of repeat consumers.

6. The method of claim 1, further comprising:
    processing historical data relating to the associated service types to fit the redemption curve for promotions having similar service types.

7. An apparatus for improving consumer traffic attributed to an inventory of promotions offered for sale at a given time via an inventory module of a promotional system, wherein the apparatus is configured for auto-replenishing the inventory of promotions, the apparatus comprising an auto-replenishment engine configure to:
    with at least a processor, access scheduling data relating to scheduled services and availability of a provider;
    with the processor, generate target data from the accessed scheduling data by applying the scheduled services and the availability to calculate a target number of consumers to redeem a promotion at the provider within a predetermined period of time;
    access the inventory module, configured to maintain and provide, in a database, a current inventory of promotions and outstanding promotions available via the promotional system for redemption at the provider, wherein the promotions and the outstanding promotions have associated promotional value and cost, and the outstanding promotions have been purchased by consumers and have associated service types;

access a redemption analytics module of the promotional system, wherein the redemption analytics module is configured to generate, with the processor, a redemption curve of historical redemptions by identifying a promotion category, inputting data relating to historical promotions having a similar promotion category, and calculating a redemption ratio;

fit the redemption curve of the historical redemptions by multiplying the redemption ratio for each time period by the sum of the current inventory and the outstanding promotions such that the fitted redemption curve reflects expected redemptions during respective time periods between the respective purchase dates and expiration dates;

calculate, with an auto-replenish calculator module implemented by at least the processor, a number of promotions to be made available for purchase and redeemable at the provider for particular associated services types, with which to replenishment the inventory and respective replenishment dates of the number of promotions by incorporating the target number into the fit redemption curve of the historical redemptions reflecting the redemption rates and the redemption ratios input from the redemption analytics module; and transmit data to the inventory module such that the inventory module causes an increase in the current inventory of promotions in the database redeemable at the provider and for sale via the promotional system on the respective replenishment dates.

8. The apparatus of claim 7, wherein generating the redemption curve of historical redemptions further comprises:

identifying the promotion category based on service types, the associated promotional value and the cost for the current inventory of promotions;

inputting data relating to outstanding historical promotions in an instance in which the historical promotions have a similar promotion category to the identified promotion category; and calculating the redemption ratio and a redemption rate for the provider for a plurality of time periods, such that the redemption ratio is a percentage of historical redemptions relative to outstanding historical promotions and the respective historical expiration dates, and the redemption rate is as a rate per unit of time at which purchased promotions are redeemed.

9. The apparatus of claim 7, wherein the auto-replenishment engine is further configured to:

generate predicted future redemption rates by processing the scheduling data, the scheduled services, and the associated service types.

10. The apparatus of claim 7, wherein the auto-replenishment engine is further configured to:

determine seasonality of associated service types and incorporating the seasonality of the associated services types into the fit redemption curve.

11. The apparatus of claim 7, wherein the auto-replenishment engine is further configured to:

calculate an estimate of repeat consumers to the provider following redemption of promotions, wherein the number of promotions and the respective replenishment dates are calculated further based on the calculated estimate of repeat consumers.

12. The apparatus of claim 7, wherein the auto-replenishment engine is further configured to:

process historical data relating to the associated service types to fit the redemption curve for promotions having similar service types.

13. A computer program product for improving consumer traffic attributed to an inventory of promotions offered for sale at a given time via an inventory module of a promotional system by auto-replenishing the inventory of promotions, the computer program product comprising at least one non-transitory computer-readable storage medium having computer-executable program code instructions stored therein, the computer-executable program code instructions are configured for:

with at least a processor, accessing scheduling data relating to scheduled services and availability of a provider;

with the processor, generating target data from the accessed scheduling data by applying the scheduled services and the availability to calculate a target number of consumers to redeem a promotion at the provider within a predetermined period of time;

accessing the inventory module, configured to maintain and provide, in a database, a current inventory of promotions and outstanding promotions available via the promotional system for redemption at the provider, wherein the promotions and the outstanding promotions have associated promotional value and cost, and the outstanding promotions have been purchased by consumers and have associated service types;

accessing a redemption analytics module the promotional system, wherein the redemption analytics module is configured to generate, with the processor, a redemption curve of historical redemptions by identifying a promotion category, inputting data relating to historical promotions having a similar promotion category, and calculating a redemption ratio;

fitting the redemption curve of the historical redemptions by multiplying the redemption ratio for each time period by the sum of the current inventory and the outstanding promotions such that the fitted redemption curve reflects expected redemptions during respective time periods between the respective purchase dates and expiration dates;

calculating, with an auto-replenish calculator module implemented by at least the processor, a number of promotions to be made available for purchase and redeemable at the provider for particular associated services types, with which to replenishment the inventory and respective replenishment dates of the number of promotions by incorporating the target number into the fit redemption curve of the historical redemptions reflecting the redemption rates and the redemption ratios input from the redemption analytics module; and transmitting data to the inventory module such that the inventory module causes an increase in the current inventory of promotions in the database redeemable at the provider and for sale via the promotional system on the respective replenishment dates.

14. The computer program product of claim 13, wherein generating the redemption curve of historical redemptions further comprises:

identifying the promotion category based on service types, the associated promotional value and the cost for the current inventory of promotions;

inputting the data relating to outstanding historical promotions in an instance in which the historical promotions have a similar promotion category to the identified promotion category; and calculating the redemption ratio and a redemption rate for the provider for a plurality of time periods, such that the redemption ratio is a percentage of historical redemptions relative to outstanding historical promotions and the respective historical expiration dates, and the redemption rate is as a rate per unit of time at which purchased promotions are redeemed.

15. The computer program product of claim 13, where the computer-executable program code instructions are further configured for:

generating predicted future redemption rates by processing the scheduling data, the scheduled services, and the associated service types.

16. The computer program product of claim 13, where the computer-executable program code instructions are further configured for:

determining seasonality of associated service types and incorporating the seasonality of the associated services types into the fit redemption curve.

17. The computer program product of claim 13, where the computer-executable program code instructions are further configured for:

calculating an estimate of repeat consumers to the provider following redemption of promotions, wherein the number of promotions and the respective replenishment dates are calculated further based on the calculated estimate of repeat consumers.

18. The computer program product of claim 13, where the computer-executable program code instructions are further configured for:

processing historical data relating to the associated service types to fit the redemption curve for promotions having similar service types.

* * * * *